United States Patent Office 2,868,763
Patented Jan. 13, 1959

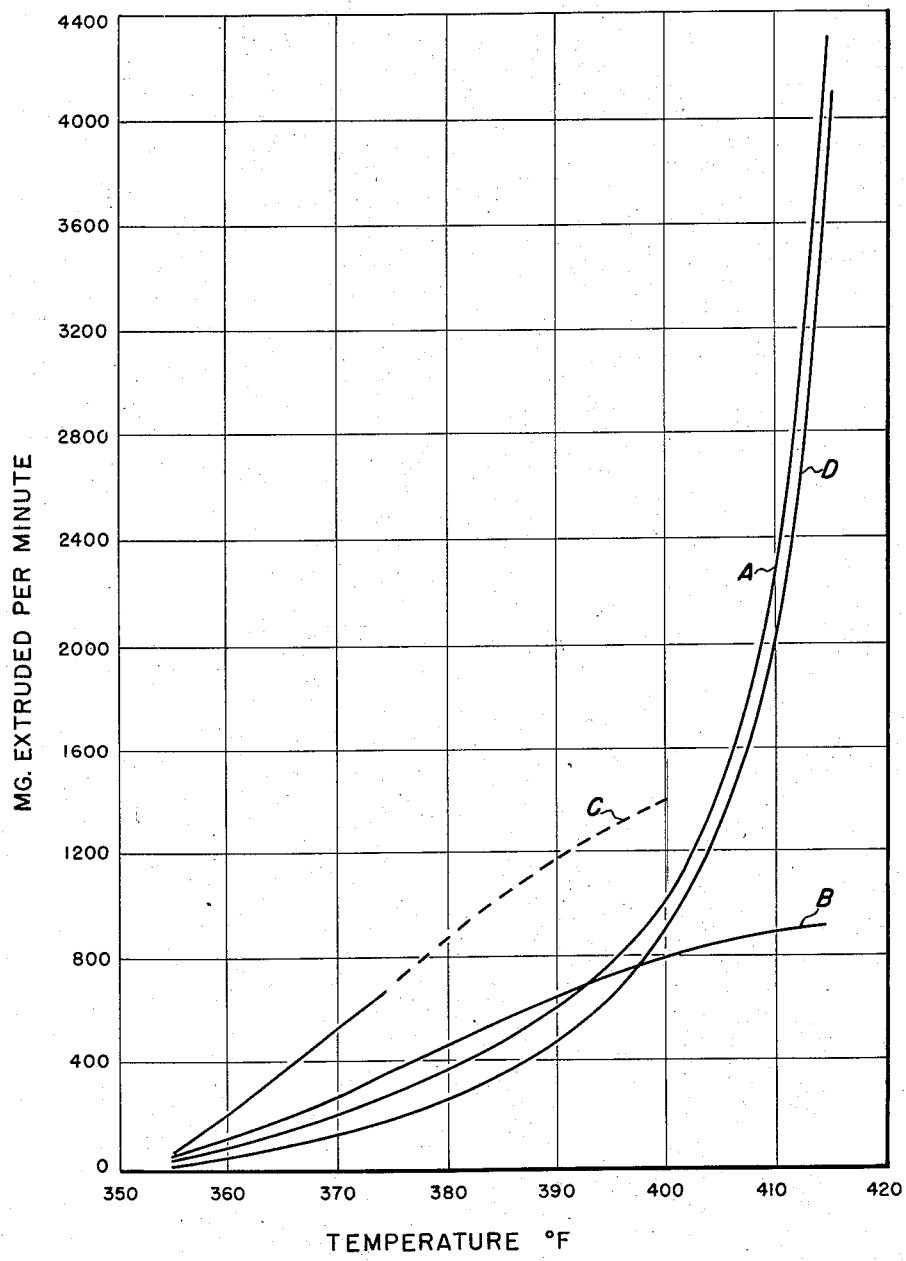

2,868,763

POLYVINYL CHLORIDE AND VINYL CHLORIDE-ALKYL ACRYLATE COPOLYMER BLEND

Charles W. Montgomery, Baton Rouge, La., assignor to Ethyl Corporation, New York, N. Y., a corporation of Delaware Application August 1, 1955, Serial No. 525,528

4 Claims. (Cl. 260—45.5)

This invention relates to a new polymeric vinyl chloride composition and more particularly to polyvinyl chloride which has superior processing characteristics.

Polyvinyl chloride (PVC) is normally hard and stiff and in use it is necessary to add substantial amounts of oily or liquid plasticizing materials to permit milling, fusing and shaping of the PVC into useful forms or articles. While improving the workability of the resin, such plasticizing materials render the final product soft and flexible. There are many uses wherein it is desired to maintain the rigidity of the original PVC in the processed articles.

There are a number of blended or copolymeric materials marketed commercially which do permit the manufacture of rigid articles. However, the degree of rigidity in the final product is essentially inversely proportional to the processability of the particular vinyl chloride polymers employed. Presently known "rigid" compositions can only be extruded, for example, at relatively low rates or require relatively long milling periods. Also, the known "rigid" PVC resins normally have a materially reduced heat distortion point, relative to the vinyl chloride homopolymer. Any improvement in flowability, without a material decrease in the heat distortion temperature or the rigidity of the final product, is highly desirable since increased flowability results in essentially a proportional decrease in cost of processing, due to increased capacity and reduced power requirements of processing equipment.

It is accordingly an object of the present invention to provide a new vinyl chloride polymeric composition having improved processing characteristics, particularly for molding and milling. Another object is to provide a new "rigid" PVC composition which can be easily shaped or formed at temperatures materially below that which the polymer tends to decompose. Another object is to provide a PVC composition of the above type which contains only a very minor quantity of monomers other than vinyl chloride. Another object is to provide an improved polymeric material of the above type having high flowability at relatively low temperatures, a high heat distortion temperature and a high thermal stability. Other objects and advantages will become apparent in the following description.

We have now found that if PVC is blended with relatively small quantities of a copolymer of vinyl chloride and an alkyl substituted acrylate that an exceptional increase in flowability of the resultant blend is obtained without appreciably reducing the heat distortion temperature of the PVC. In fact, in many cases the copolymer actually increases the heat distortion point above that of unblended PVC. The flowability of the resultant blend is increased several fold when using as small a concentration as about one percent of acrylate or lower, based on the total weight of the blend. Thus, it is found that the use of an acrylate in the form of a copolymer with vinyl chloride can treble or quadruple the capacity of some processing equipment without materially increasing the power load of the equipment. This is illustrated in the graph discussed more completely below.

The concentration of acrylate in the copolymer as such is preferably between about 5 and 15 percent but can range as low as one percent up to about 50 percent. However, the total concentration of acrylate in the total blend should not normally exceed about 25 percent and preferably should consist of only between about ½ and 5 percent of the total blend. Exceptional changes in flowability will be obtained when the acrylate content of the blend is even as low as 0.1 percent.

The acrylates suitable for copolymerization with vinyl chloride which provide suitable blending agents with PVC are alkyl substituted acrylates. The alkyl group should contain between 2 and 16 carbon atoms. However, optimum results are obtained when the alkyl substitution contains between 4 and 10 carbon atoms. The alkyl substitution can either be a straight chain alkyl group or a branched chain. Typical examples of suitable acrylates are; n-butyl acrylate, n-hexyl acrylate, 2-ethyl hexyl acrylate, n-heptyl acrylate, 1-methyl heptyl acrylate, n-octyl acrylate, 6-methyl heptyl acrylate, n-nonyl acrylate, iso-nonyl acrylates, such as 3,5,5-trimethylhexyl acrylate, and undecyl acrylate.

The PVC and the copolymer for blending therewith can be made of the well known polymerization techniques, including emulsion and suspension processes. Any of the general purpose of easy-type resins presently on the market are suitable for this purpose. Particularly useful PVC resins can be prepared in accordance with the processes disclosed in U. S. Patents 2,494,517 and 2,528,469.

The blending of the polyvinyl chloride and the copolymer can be carried by a wide variety of procedures. Normally, the finely divided polymers are mechanically mixed and thereafter used for extrusions or other processing. In some cases it is desired to effect the blending with the polymers in a molten state.

The following are typical examples of compositions and methods of preparation which illustrate the present invention but are not intended to limit the same. All compositions are given in parts by weight.

Example I

A copolymer of vinyl chloride (90%) and 2-ethyl hexyl acrylate (10%) was prepared by suspension polymerization using potassium persulfate as a catalyst in carrying out the polymerization at 50° C. for 4.5 hours. Sodium lauryl sulfate was employed as the emulsifying agent in this copolymer. Ten (10) parts were then blended with 90 parts of a commercial grade of PVC to give a homogeneous composition. The final blend composition had exceptional flow characteristics, particularly at temperatures above about 400° F. The flow characteristics of this material were measured on an extrusion plastometer and compared with the best grades of rigid PVC resins presently available commercially. Figure 1 shows a graph plotting the quantity of resin extruded in milligrams per minute versus the temperature of the extrusion in ° Fahrenheit. In this figure, a blend (curve A) of the present invention is compared with a commercial PVC resin (curve B). The same PVC was employed as was used in the blend of this example. The flow characteristics of the unblended copolymer is plotted as curve C. The latter copolymer is quite unstable and tends to decompose at temperatures above about 375° F. Accordingly, the curve above this temperature cannot be accurately determined due to partial decomposition.

From the figure, it can be seen that the compositions of the present invention are more rigid at moderate temperatures, i. e., below about 400° F. Thus, the blend will form a product having a high heat distortion point. However, at temperatures above about 400° F. the flowability of the blended material increases at a very rapid rate so as to permit easy processing, such as in extruding, calendering and molding. When the composition of this invention is compared with the unblended PVC, it is seen that its flowability at moderate temperatures is appreciably lower than PVC, but at the more elevated temperatures, employed for processing, its flowability is several times that of the PVC.

At moderate and slightly elevated temperatures, the rigidity of the composition of the present invention is even more pronounced when compared with the acrylate copolymer itself. Not only is the acrylate copolymer softer at moderate temperatures but the copolymer tends to decompose at only slightly elevated temperatures. Surprisingly, when it is blended with PVC, the resulting blend does not exhibit this thermal instability.

It also should be noted that there is a synergistic improvement in flowability. The broken curve on the figure shows the expected flow of the blend, based on the flow of the individual components. This curve represents the blend having the combined flowability of the copolymer (10 percent) and unblended PVC (90 percent). Thus, the expected properties of the blend would be only slightly improved over PVC itself and would show the same tendency of only intermediate rigidity at the lower temperatures and only small increases in flowability at temperatures above 400° F. In contrast, however, the actual blend is directly the opposite from that which is expected. Not only does the actual blend have excellent rigidity at low temperatures and exceptional flowability at higher temperatures, but the blend is even better than PVC itself at the lower temperatures and more than twice as good in flowability as the copolymer itself at higher temperatures. While for normal processing operations, the temperature and the flowability shown in the graph is more than adequate for most uses, it is believed apparent that at higher temperatures even greater flowability is obtained without any appreciable decomposition of the blend.

*Example II*

A copolymer of n-butyl acrylate (10%) and vinyl chloride (90%) was prepared similarly to the preparation of the copolymer in Example I. This copolymer (5 parts) was then blended with PVC (90 parts) and polymethyl methacrylate (5 parts). The flow characteristics were again tested in an extrusion plastometer with the results also plotted in the figure as curve D. It will be seen that the flowability of this composition is only slightly less than that of the copolymer of Example I and is a material improvement over any of the commercial polyvinyl chloride compositions presently marketed.

*Example III*

Example I is repeated using the same copolymer but using different proportions of copolymer and PVC. With compositions containing from 5 to 15 percent of acrylate based on the total weight of the blend similar results are obtained. With concentrations of acrylate, based upon the total weight of the blend, as low as one percent, a distinct improvement in flowability was obtained. With higher concentrations of acrylate as a copolymer in the blend, i. e., up to about 25 percent of acrylate copolymer, based upon the total weight of the blend, the flowability is somewhat increased over the preferred range but the heat distortion temperature is somewhat reduced and the final product has somewhat lesser rigidity. Also, higher concentrations of the acrylate tend to reduce somewhat the stability of the blended material when employing copolymers containing above about 10 percent of the acrylate.

*Example IV*

A copolymer of vinyl chloride (90 percent) and 2-ethyl hexyl acrylate (10 percent) was prepared by suspension polymerization using lauryl peroxide as the catalyst. The polymerization was carried out at a temperature of 50° C. for nine hours. The sodium salt of dioctyl sulfosuccinate (Aerosol-OT) was employed as the suspending agent. Essentially complete polymerizations of the monomers were obtained under these polymerization conditions. The polymerization recipe is as follows:

| | Parts |
|---|---|
| Water | 400 |
| Vinyl chloride | 90 |
| 2-ethyl hexyl acrylate | 10 |
| Lauryl peroxide | 0.3 |
| Dioctyl sulfosuccinate | 0.4 |
| Methyl cellulose | 0.8 |

Ten parts of the copolymer prepared as above was then blended with 90 parts of the commercial grade PVC to give a homogeneous composition. The final blend composition was similar to the blend obtained in Example I using an emulsion polymerized polyvinyl chloride except that the flow characteristics were even somewhat improved and the impact strength of the extruded articles of this blend were somewhat higher than corresponding articles of the material of Example I. Also the heat distortion point of this blend was comparable to that of the emulsion polymerized copolymer blend.

When copolymers of vinyl chloride and n-hexyl acrylate, n-heptyl acrylate, 1-methyl heptyl acrylate, n-nonyl acrylate and undecyl acrylate are employed in Example I, instead of the copolymers of 2-ethyl hexyl acrylate, similar results are obtained. Also, when ratios of PVC to copolymer of 95:5 and 85:15 are employed satisfactory results are obtained.

In some cases, it is desirable to employ other polymeric components in the blend. For example, small quantities of polymethyl/methacrylate, polymethyacrylate, polyacrylonitrile, polystyrene, copolymers of acrylonitrile and styrene, and other polymers can be blended with the PVC and acrylate copolymer of this invention. Normally, these third components should not be present in excess of 25 percent by weight of the total blend, and preferable not in excess of 10 percent. Thus, when the above examples are repeated using 5 and 10 percent of methylmethacrylate or when using similar concentrations of polystyrene, similar results are obtained.

As is believed apparent from the foregoing, the present invention provides a polyvinyl chloride composition which contains only minor quantities of material other than polyvinyl chloride but which is a distinct improvement over the polyvinyl chloride or polyvinyl chloride containing materials known at the present time with respect to flowability, stability and heat distortion temperature. The compositions of the present invention are accordingly extremely useful for extruding, molding and other process techniques in which it is necessary to obtain high flowability and at the same time obtain rigid and strong final product.

I claim:

1. A polymeric composition having high flow characteristics at normal processing temperatures consisting essentially of polyvinyl chloride and a copolymer of vinyl chloride and an alkyl substituted acrylate in which the alkyl group contains between 2 and 16 carbon atoms and in which said copolymer consists essentially of from 1 to 50 percent by weight of said acrylate and from about 99 to 50 percent by weight of vinyl chloride, the acrylate being present in the blend in a concentration of less than 25 percent by weight of the weight of the total polymeric composition.

2. The composition of claim 1 in which the alkyl substituent in the acrylate contains between 6 and 10 carbon atoms.

3. The composition of claim 1 wherein the quantity of acrylate, as said copolymer, is between ½ and 50 percent by weight of the total weight of the blend.

4. The composition of claim 3 wherein the copolymer contains from 5 to 15 percent by weight of said acrylate and from 95 to 85 percent of said vinyl chloride.

References Cited in the file of this patent

UNITED STATES PATENTS

| 2,247,064 | Nowak | June 24, 1941 |
| 2,611,153 | Semegen | Sept. 23, 1952 |

FOREIGN PATENTS

| 747,644 | Germany | Oct. 9, 1944 |